Figure 1:
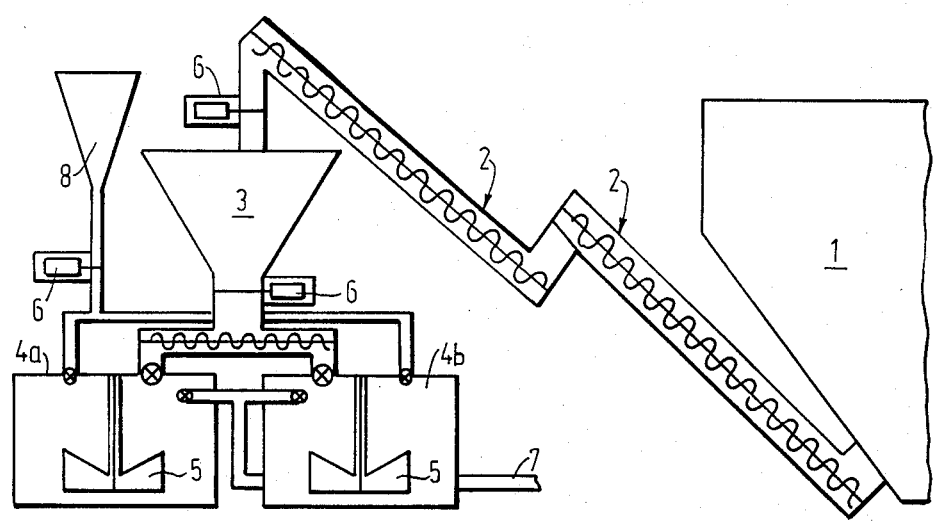

United States Patent [19]
Annett et al.

[11] Patent Number: 4,984,933
[45] Date of Patent: Jan. 15, 1991

[54] GROUTING METHOD AND APPARATUS

[75] Inventors: Martin F. Annett, Oxford; Barry France, Hythe; Tania Stanford, Milton Keynes, all of United Kingdom

[73] Assignee: Fosroc International Limited, Birmingham, England

[21] Appl. No.: 415,945

[22] Filed: Oct. 2, 1989

[30] Foreign Application Priority Data

Oct. 3, 1988 [GB] United Kingdom ................ 8821395

[51] Int. Cl.⁵ ............................................. E21D 11/00
[52] U.S. Cl. ..................................... 405/150; 405/146; 405/269; 405/263; 166/293
[58] Field of Search ................ 405/266, 258, 288, 146, 405/150, 269, 263; 106/74, 76; 166/293

[56] References Cited

U.S. PATENT DOCUMENTS

| | | | |
|---|---|---|---|
| 3,928,052 | 12/1975 | Clement | 106/76 |
| 4,019,327 | 4/1977 | Kempster | 405/288 |
| 4,367,986 | 1/1983 | Miyoshi et al. | 405/266 |
| 4,470,463 | 9/1984 | Holland | 166/293 |
| 4,480,693 | 11/1984 | Newlove et al. | 166/293 |

Primary Examiner—Dennis L. Taylor
Attorney, Agent, or Firm—Caesar, Rivise, Bernstein, Cohen & Pokotilow, Ltd.

[57] ABSTRACT

A gelling agent is added to a fast setting cement slurry comprising water, cement and anti-washout retarder and the mix is injected into a void containing running water and allowed to set to form rapidly a material of high compressive strength.

10 Claims, 1 Drawing Sheet

GROUTING METHOD AND APPARATUS

The invention relates to a grouting method and apparatus, and in particular for the placement of self-setting cementitious grouts in wet conditions. In particular, the invention is applicable to the placement of grout in the clearance or void between segmental blocks of a lining in a tunnel and the facing tunnel bore wall, and more especially to carrying out this step when a tunnel is being bored at a fast rate. One specific use of the invention is in the drilling of the Channel Tunnel where there can be a severe seepage of water into the clearance and despite this the tunnel boring must be advanced at a fast rate.

U.S. Pat. No.-A-3672173 published in 1972 is concerned with the formation of a self-supporting water-impermeable barrier in a mine passage by means of apparatus controlled from a remote location, e.g. outside the passage. In the method, an aqueous cement slurry is combined with an aqueous silicate solution to form a fast setting cement composition which is sprayed on to the floor and walls of the desired shape. The formed barrier is a rigid mass erosive to running water and able to withstand the hydrostatic pressures encountered within the passage after the barrier has been formed. Example 1 shows that under laboratory conditions a fast setting mixture was made up and allowed to thicken; the thickened mass was placed in water running at about 0.7 gallons/minute (3.15 liters per minute) and allowed to harden. About 4% of the mass was washed away by erosion. The document teaches that fillers such as fly ash or silica flour can be added to retard the setting time and that bentonite can be included as a thixotropic agent. Our work has shown that such a composition cannot set in fast running water.

U.S. Pat. No.-A-3483007 published in 1969 teaches that the addition of a hydroxyalkyl ether cellulose to an aqueous cement grout useful in well cementing will reduce the loss of liquid through porous earth walls defining the well bore. The cement solution comprised 100 parts cement, 35 to 65 parts water, at least 5 parts of a salt, and 0.01 to 2.5 parts of the cellulose.

U.S. Pat. No.-A-4470463 published in 1984 relates to the cementing of deep wells in a weak formation not able to bear the weight of a dense cement. The document proposes the use of a lightweight cement slurry comprising 150 to 250 parts water, 100 parts cement, 10 to 15 parts bentonite, 0.5 to 1.5 parts of sodium silicate and 0.1 to 1.5 parts of hydroxyethyl cellulose. In an example, Example 7, a slurry is pumped down 12000 feet (11076 meters) to return to the surface.

There is a problem in setting a cement in the presence of fast running water present in a void when one is drilling in the void, e.g. a tunnel or like excavation, in order to form a structure such as a lining in the tunnel. The water emerges at a fast rate from the walls of the bore in the formation and of course where and when it emerges and how fast cannot be predicted. It has now been discovered, according to the invention, that by including a defined retarder in the cement grout and setting the cement by means of a gelling agent, one can cause the cement to set quickly and develop high early strength.

According to the invention in one aspect there is provided a method of placing and setting a cementitious material in a void containing water, the method comprising supplying a cement grout of cement and water to the void, and at or immediately before placement adding a gelling agent therefor, wherein the cement grout contains an anti-washout retarder, and the formed mixture of grout and gelling agent is supplied to the void containing the water, the content of the gelling agent relative to the retarder being selected so that the cement will set rapidly to develop high compressive strength.

Preferably, the gelling agent is selected according to the nature of the self-setting material of the grout. Most preferably the gelling agent is a sodium silicate, aluminium sulphate or magnesium sulphate or the like. Because such agents tend to be rapid acting, the grout contains an anti-washout retarder, e.g. a water soluble natural or synthetic polymer which will surround particles of the cement or other self-setting material to protect such particles from being washed out by the static or flowing water present in the void. By adjustment of the quantity of the retarder, the quantity of the gelling agent relative to the dry cement or other hydraulic ingredients can be up to say 8%, preferably 3 or 4%, better to control the rate of placement.

The cement may be a cement such as Ordinary Portland Cement and a pozzolanic or like material such as pulverised fly ash, blast furnace slag or the like may be present in the grout. Sand and/or aggregates may be present. Preferably the retarder is selected so that the grout may be held in a holding tank for several hours, e.g. six. The anti-washout retarder may be a hydroxyethyl cellulose ether or the like. The quantity of the anti-washout retarder will be about 0.25% by weight, relative to the cement or other dry hydraulic ingredients. Additives may be present provided that they do not significantly affect the rate of set or strength development of the cement composition. It is preferred to add an anti-foaming agent, to prevent air entrainment which would weaken the set material.

The formed composition of grout and gelling agent is preferably delivered to the void by injection. For this purpose the invention provides apparatus comprising delivery means for delivering the grout to a void and means for injecting a gelling agent at or immediately before placement. Most preferably the gelling agent is supplied to an inline mixer in the delivery means located at or near the outlet of the delivery means.

The void is usually present in an excavation, e.g. mine passage or a tunnel, and is usually the gap between the bore wall and the lining.

Figure 2:
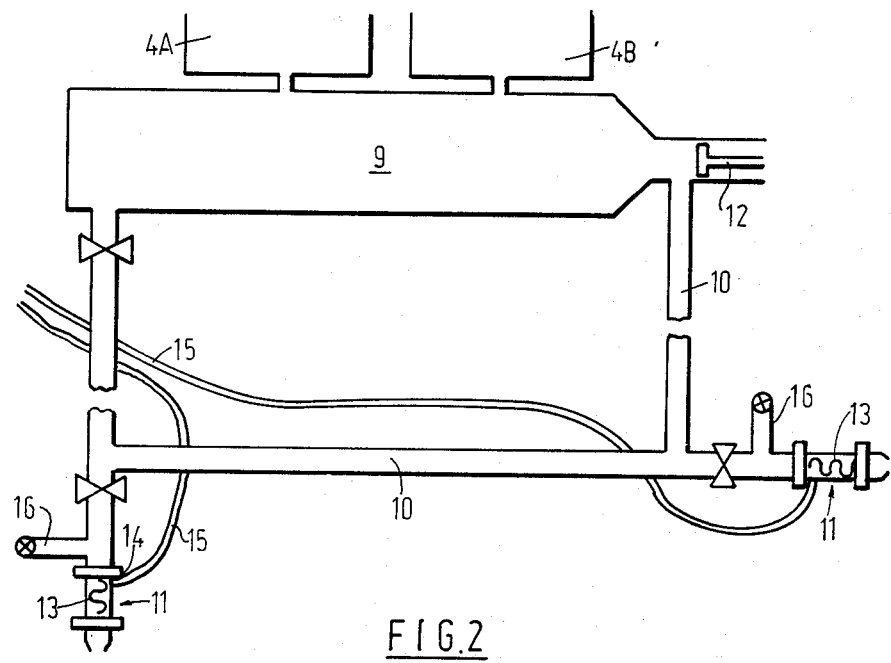

In order that the invention may be well understood it will now be described by way of example only with reference to the accompanying drawing in which:

FIG. 1 is a schematic longitudinal sectional elevation of the grout preparation stage of the apparatus of the invention FIG. 2 is a schematic view showing the circuit of the grout dispensing stage of the apparatus.

A tunnel boring machine (not shown) comprises a leading tunnel boring head, followed by a segment laying section and trailing section including apparatus for grouting the segments into position, laying rail track and the like. The machine measures about 25 meters long.

The segments are usually formed of concrete and are laid in portions, three to the floor (the invert), two for the sides and then the top section. Grout is supplied from apparatus mounted on the trailing section via pipes which end in lances directed into the clearance between the outer wall of the segments and the facing wall of the bore. Often water has seeped or is flowing fast into that clearance before the grout is placed.

FIG. 1 shows a portion of the trailing section. A storage hopper 1 contains a dry cementitious powder such as a pulverised fly ash/Ordinary Portland Cement mixture in the weight ratio of 3:1. Feeders 2, such as scroll mixers, lead from the storage hopper 1 to a top hopper 3 mounted above and connected to two mixing chambers 4A, 4B. Each contains a mixing device 5, e.g. a paddle. The flow of powder is controlled by volumetric or weight flow meters 6. Water is supplied via pipes 7 into each mixing chamber 4A, 4B. A liquid solution containing an anti-washout retarder for the cement powder is present in a hopper 8 and is supplied into each mixing chamber 4A, 4B also under the control of a volume flowmeter 6. In operation, powder, water and retarder are drawn from their respective stores into mixing chambers in turn, and the mixed composition is then fed to a holding chamber 9. The chamber 9 is in circuit with a long pipe 10 having injection lances 11, some at the leading end for invert grouting and others at the trailing end for grouting between segmental rings. A pump 12 is present in the circuit. An inline static mixer 13 is present at the forward end of each lance 11, and is connected to an inlet 14 for a line 15 containing a liquid containing a gelling agent such as sodium silicate, aluminium sulphate or the like. A water flushing pipe 16 is present just rearwardly of the lance outlet.

In use, when one or more segments are placed, the operator activates the pump 12 using controls (not shown) to pump grout from the holding chamber 9 into the pipe 10 and the lances 11, and then gelling agent solution is supplied through the lance to the dispensed grout just before placement, the rate of addition of gelling agent being selected relative to the content of retarder in the grout so that the placed grout will gel and/or set in 10 to 15 minutes, despite the presence of any static or running water in the annulus between the segment and the bore wall. The cement, water, retarder and gelling agent are selected so that the set material will have a load bearing compressive strength after 24 hours of about 0.6 to 1 Newton/mm$^2$ so that rail track can be laid on the floor segments whereby the tunnel boring machine can move forward at a predetermined rate. When the gelling agent (sodium silica sol) was added at the rate of 4% vol/vol, the gel time was 20 minutes and the strength after 1 day was 1.92 N/mm$^2$.

The set material will attain a compressive strength after 28 days of about 6 to 8 N/mm$^2$.

We claim:

1. A method of placing and setting a cementitious material in an annulus present between a tunnel bore and the lining therein, the annulus containing static or running water, the method comprising supplying into the annulus a cement grout of cement particles, water and an anti-washout retarder which will surround the particles to protect them from being washed out of the annulus, the retarder being present in an amount of about 0.25% by weight of the dry cement, and, at or immediately before placement adding a gelling agent therefor, the content of the gelling agent being selected relative to the retarder so that the cement will set rapidly to develop high compressive strength.

2. A method according to claim 1 including the step of adjusting the content of gelling agent and of the anti-washout retarder so that the placed material will gel or set in about 10 to about 20 minutes after placement.

3. A method according to claim 1 including the step of adding an antifoaming agent to prevent air entrainment which would cause weakness in the set material.

4. A method according to claim 1, including the step of selecting a silicate as the gelling agent.

5. A method according to claim 4, including the step of selecting the gelling agent from the group of sodium silicate, and silica sol, aluminum sulphate and magnesium sulphate.

6. A method according to claim 1, including the step of selecting a hydroxycellulose ether as the anti-washout retarder.

7. A method according to claim 1, including the step of selecting pulverized fuel ash and Ordinary Portland cement, in a weight ratio of 3:1 as the cement particles.

8. A method according to claim 1, including the step of selecting an anti-washout retarder to retard the setting for at least six hours.

9. A method according to claim 1, including pumping the grout to the void via a pipeline including an inline mixer present at or near the outlet end and injecting the gelling agent into the pipeline via the mixer.

10. A method according to claim 1, including the step of selecting the cement particle anti-washout retarder and gelling agent so that the set material has a strength 24 hours after placement of at least 1 Newton/mm$^2$.

* * * * *